(No Model.) 2 Sheets—Sheet 1.
S. STANDISH.
FRUIT PITTING MACHINE.
No. 529,817. Patented Nov. 27, 1894.
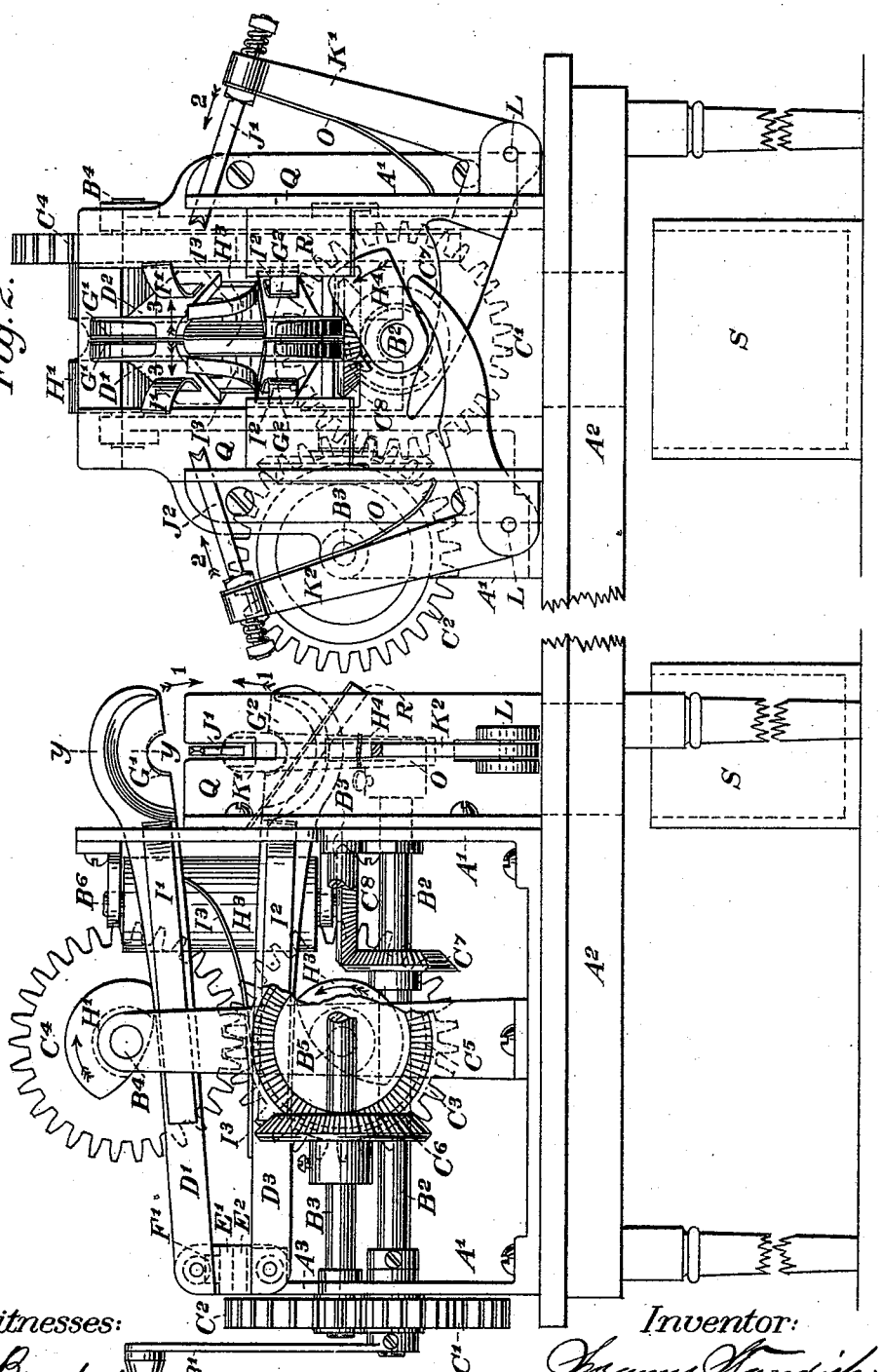
Witnesses:
E. A. Brandau
Wilson D. Bent Jr.
Inventor:
Syrannus Standish
By John Richards
Atty (No Model.) 2 Sheets—Sheet 2.
S. STANDISH.
FRUIT PITTING MACHINE.
No. 529,817. Patented Nov. 27, 1894.
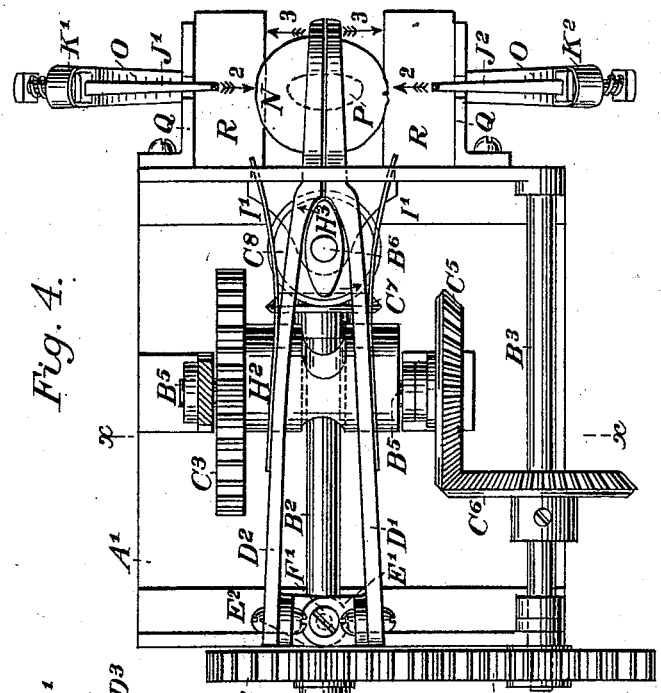
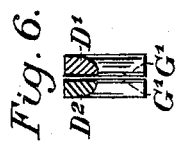
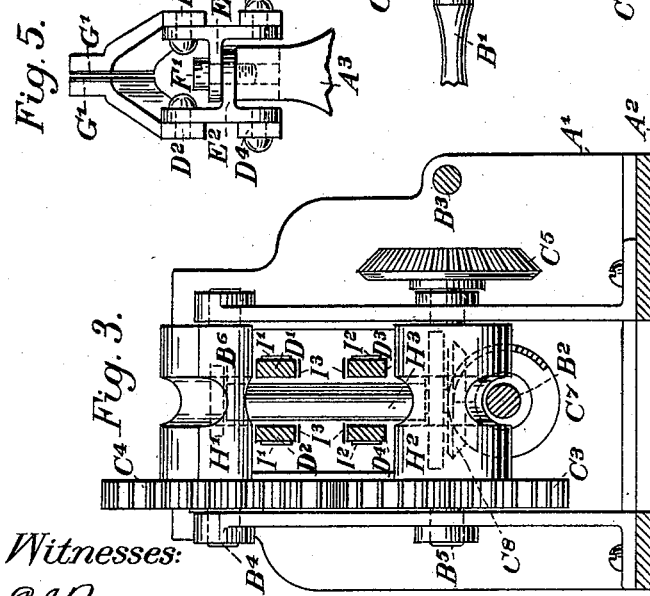
Witnesses:
E. A. Brandau
Wilson D. Bentz
Inventor:
Spencer Standish
By John Richards
Atty

UNITED STATES PATENT OFFICE.

SYRANUS STANDISH, OF GRIDLEY, CALIFORNIA.

FRUIT-PITTING MACHINE.

SPECIFICATION forming part of Letters Patent No. 529,817, dated November 27, 1894.

Application filed May 21, 1894. Serial No. 511,974. (No model.)

*To all whom it may concern:*

Be it known that I, SYRANUS STANDISH, a citizen of the United States, residing at Gridley, county of Butte, and State of California, have invented certain new and useful Improvements in Fruit-Pitting Machines; and I hereby declare the following specification and drawings therewith to be a complete description of my improvements.

My invention relates to machines for removing the pits or seeds from peaches, plums or other fruit of the kind, and consists of hinged or pivoted knives or cutters to sever the fruit transversely at the center, and then by a side movement of the same knives strip the pulp from the score each way leaving it in two parts ready for drying; also consists in a method of clamping and holding the pit or seed while the pulp is being removed, and then discharging the former clear of and independent of the pulp.

My invention further includes various other functions to be hereinafter explained and set forth, performed automatically by an organized machine that can be driven by hand or power, constructed substantially as represented in the drawings herewith, in which—

Figure 1 is a side elevation with some of the parts removed. Fig. 2 is a front end elevation of the same machine. Fig. 3 is a partial section on the line $x$—$x$ of Fig. 4. Fig. 4 is a plan view of the machine. Fig. 5 is a detail showing the universal bearings on which the pivoted knife levers are mounted. Fig. 6 is a section through the knives or cutters on the line $y$—$y$, Fig. 1.

Similar letters of reference indicate corresponding parts throughout.

A is a supporting frame on which the several parts of the machine are supported, adapted to stand on a bench or table $A^2$. Power is applied to the machine by a crank B when operated by hand, or by a pulley on the shaft $B^2$ if the machine is to be driven by power. Motion is imparted from this shaft to the parallel one $B^3$, the two transverse shafts $B^4$ $B^5$ and the vertical one $B^6$, by means of tooth wheels $C'$ $C^2$ $C^3$ $C^4$ $C^5$ $C^6$ and $C^8$, as will be hereinafter more fully explained.

Arranged centrally in the machine are four levers being pivotally supported, as shown in Fig. 5, so as to be capable of movement at their outer ends in all planes. The pivotal or universal joint, on which these levers are supported shown in Fig. 5, consists of two main members $E'$ $E^2$ mounted on the standard $A^3$ of the main frame by means of a pivotal screw $F'$, the levers $D'$ $D^2$ $D^3$ and $D^4$ being loosely attached to the members $E'$ $E^2$ by screws or rivets, as shown in the drawings, thus forming universal joints capable of free movement in all planes. The outer ends of these levers $D'$ $D^2$ $D^3$ and $D^4$ are provided with four curved knives, an upper pair $G'$ and a lower pair $G^2$, as seen in Figs. 1 and 6, and are operated in their working or cutting movements, vertically by the cams $H'$ $H^2$, and horizontally by the cam $H^3$, the return movement in both planes being produced by springs $I'$ $I^2$ and $I^3$, as shown in Figs. 1 and 4.

Referring again to the transmitting gearing, the shaft $B^2$ being the prime mover communicates motion to the shaft $B^3$ by means of the spur wheels $C'$ $C^2$, and to the shaft $B^5$ by means of the bevel wheels $C^5$ $C^6$, and to the shaft $B^4$ by the spur wheels $C^3$ $C^4$, and to the vertical shaft $B^6$ by the bevel wheels $C^7$ $C^8$.

Referring next to the pit or seed-holding devices of my machine, these consist of two spurs $J'$ $J^2$ attached to the crank levers $K'$ $K^2$, pivoted at L, and operated by a cam $H^4$ on the end of the shaft $B^2$, as seen in Fig. 2. The action of the spurs $J'$ $J^2$ is intermittent, the cam $H^4$ acting only throughout a portion of the revolution of the shaft $B^2$, as may be seen in Fig. 2. This permits a pause when the levers $K'$ $K^2$ and spurs $J'$ $J^2$ are expanded, so the fruit N can be inserted, as shown in Fig. 4. The closing and side movements of the levers $D^1$ $D^2$ $D^3$ and $D^4$ are also intermittent for the same reason, the vertical movement being governed by the cams $H'$ $H^2$, and the lateral movement by the double cam $H^3$ between the levers $D'$ $D^2$ $D^3$ $D^4$, producing also a still period or pause in the following manner:

The bevel wheel $C^7$ on the shaft $B^2$ has a blank space at one side in which the teeth are omitted, as seen in Figs. 1 and 3, permitting the vertical shaft $B^6$ and the double cam $H^3$ to remain at rest during such portion of the revolution of the shaft $B^2$, as the omitted teeth in the wheel $C^7$ may determine.

Referring next to the manner of operating, when the cams $H'$ $H^2$ are in the position shown in Fig. 1, and the levers D' D² D³ and D⁴ are expanded in a vertical plane by means of the springs I², and are pressed close together sidewise, as in Figs. 2 and 4, by the springs I' I², the fruit N is inserted as seen in Fig. 4. The cams H' and H² then engage the levers D' D² D³ and D⁴, pressing them together, the pair of upper knives G', and the pair of lower knives G², acting each as one edge, severing the pulp around the center of the fruit N down to the pit or seed P. At the same time the cam H⁴ engages the levers K' K², which move forward, and the spurs J' J² penetrate the pulp of the fruit N seizing the pit or seed P at each end. At this point the wheel C⁷ engages the wheel C⁸, turning the cam H³, forcibly expanding the levers D' D² D³ and D⁴ horizontally, the knives G' G² stripping off the pulp of the fruit N each way, leaving the pit P between the ends of the spurs J' J². The spurs J' J² then recede by action of the springs O O and by release of the cam H, and the two halves of the pulp are stripped off the spurs K' K² by the guards Q Q, and fall on the chutes R and roll into a receptacle below, the seed or pit P falling into a box or vessel S.

The fruit N can be fed to the machine by hand or with suitable apparatus acting automatically for that purpose, the operation of the machine being in that case continuous and rapid.

Having thus described the nature and objects of my invention, what I claim, and desire to secure by Letters Patent, is—

1. In a fruit pitting machine, the combination of two pairs of independent knives or cutters having both a vertical and a horizontal movement, a universal joint which permits said movements, and a vertical revoluble double cam between the cutters which operates to laterally expand the members of the pairs, substantially as described.

2. In a fruit pitting machine, two pairs of cutters or knives to score the fruit around the center; hinged levers to support the cutters or knives, a double cam between the levers to produce lateral movement thereof, and strip the pulp off the fruit each way from the seed or pit, in the manner substantially as described and the cams acting upon the upper pair of levers and also upon the lower pair of levers for the purpose of bringing them and the cutters together.

3. In a fruit-pitting machine, four scoring knives or cutters to sever the pulp of the fruit into two parts, mounted on hinged levers that move in both a vertical and horizontal plane; revoluble cams between and operating all the levers and the knives thereon simultaneously to sever and strip the pulp from the pit or seed, in the manner and for the purposes substantially as specified.

4. In a fruit-pitting machine, the combination of pairs of movable levers and cutting knives thereon, hinged to move vertically and horizontally so as to score and strip the pulp from the pit or seed of the fruit; revoluble cams to move the levers and knives intermittently, vertically and horizontally scoring, and then stripping the pulp from the pit or seed of the fruit, in the manner and for the purposes substantially as described and shown.

5. In a fruit-pitting machine, the combination of scoring and stripping knives or cutters operating intermittently by cams, in the manner described; spurs to penetrate the pulp, seize and hold the pit or seed, operated by a cam whose shaft has a gear engaged by a segmental tooth wheel, permitting a pause and relative movement of the spurs in respect to the scoring and stripping knives or cutters, in the manner and for the purposes substantially as described and shown.

6. In a fruit-pitting machine, the combination of hinged levers and knives or cutters to score and strip the pulp from the fruit in the manner described; two pivoted brackets turning on a common center and the levers hinged thereto, so as to permit free movement of the levers and knives in two planes, and thus score and then strip the pulp from the pit or seed of the fruit, in the manner substantially and for the purposes specified.

7. In a fruit pitting machine, the combination of an upper pair of scoring and stripping knives or cutters, a lower pair of similar knives or cutters, spurs to seize and hold the pit or seed, a revoluble cam between the knives for causing their lateral expansion, cams acting to bring the knives together vertically, and gearing connections to produce coincident motion of the several parts of the mechanism, substantially as described.

8. In a fruit pitting machine, the combination of pairs of knives or cutters capable of both a vertical and a horizontal movement, a vertical cam device which is revoluble for the purpose of causing lateral movement of the cutters, a cam device for actuating the upper pair of cutters, a cam device for actuating the lower pair of cutters, and a gearing mechanism whereby the several cams operate simultaneously to produce the proper movement of the cutters, substantially as described.

9. In a fruit pitting machine, the combination of pairs of knives or cutters, the hinged levers for supporting them, a universal joint which permits a vertical and a horizontal movement of the levers and cutters, a double cam between the levers for causing a lateral movement thereof, a cam device for actuating the upper pair of cutters, and a cam device for actuating the lower pair, and springs for restoring the cutters to their normal position, substantially as described.

10. In a fruit pitting machine, the combination of knives or cutters having both a vertical and a horizontal movement, a revoluble cam between and operating said knives, a cam device for actuating the upper pair of cutters, a cam device for operating the lower pair of cutters, springs for restoring them to their normal position, spurs which penetrate the pulp and hold the seed, mechanism for operating said spurs, and gearing connections whereby the several mechanical parts operate in unison as specified.

In testimony whereof I have hereunto affixed my signature in the presence of two witnesses.

SYRANUS STANDISH.

Witnesses:
C. D. ALLEN,
L. T. ALLEN.